Nov. 19, 1929.    C. J. RODMAN ET AL    1,736,464
DEOXIDIZER
Filed July 20, 1923
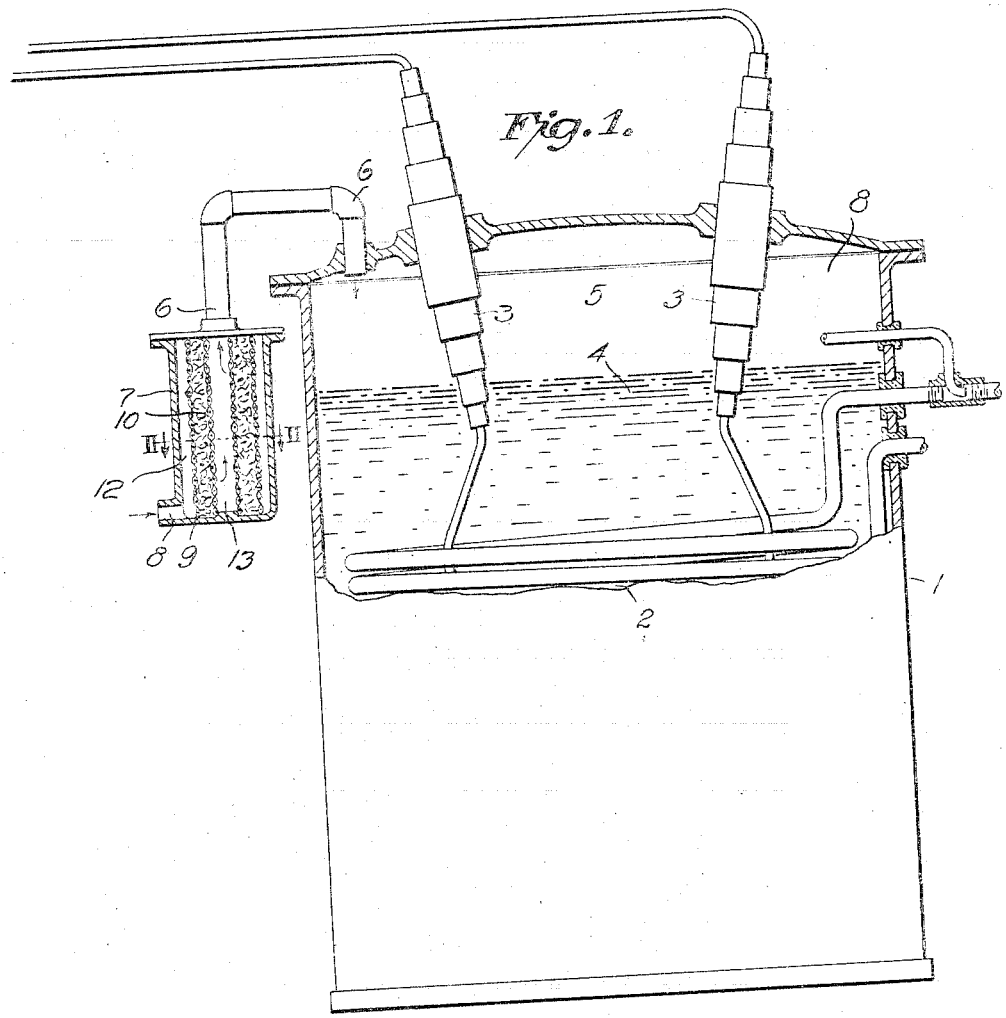
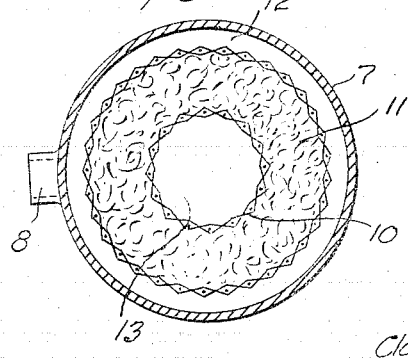
INVENTORS
Clarence J. Rodman and
Aylmer H. Maude Patented Nov. 19, 1929

1,736,464

UNITED STATES PATENT OFFICE

CLARENCE J. RODMAN AND AYLMER H. MAUDE, OF WILKINSBURG, PENNSYLVANIA, ASSIGNOR TO WESTINGHOUSE ELECTRIC & MANUFACTURING COMPANY, A CORPORATION OF PENNSYLVANIA

DEOXIDIZER

Application filed July 20, 1923. Serial No. 652,668.

This invention relates to means for obtaining inert atmospheres, more particularly to a material which is capable of removing oxygen from air in order to provide a resultant gas which does not detrimentally affect insulating oil with which the air comes in contact.

In various applications, such as transformers, circuit breakers and the like, there is provided a container for the apparatus which is generally immersed in an insulating oil, which does not extend to the top of the container, but an air space is provided therein to allow for the expansion and contraction of the oil. This causes breathing of the apparatus, which results in air being continually brought into contact with the insulating oil, reacting with the same to form a sludge. Furthermore, some of the water in the air condenses within the gas space on the metal parts and gets into the oil. Both of these effects cause a material decrease in the insulating properties of the oil.

It has been proposed to obviate this difficulty by interposing, between the air space in the container and the outside air, a device for absorbing moisture and oxygen from the air whereby only an inert gas may come in contact with the surface of the oil. Various substances have been proposed for this purpose, some of which are fairly successful. However, there are certain disadvantages inherent in these substances, such as the deterioration thereof when not in use, the too rapid action thereon on the incoming air and the necessity for providing artificial means for initiating the oxygen absorbing reaction.

Our invention is directed to a material which obviates these disadvantages, it being among the objects thereof to provide a substance capable of removing oxygen from the air which shall not deteriorate on long standing and which shall not require artificial means for causing the same to react with the oxygen.

It is a further object of our invention to provide a substance which shall react with air to produce a resultant gas mixture which contains nitrogen and carbon dioxide.

In practicing our invention, we provide a substance, such as an oxidizable salt, preferably of an inorganic nature, which is capable of reacting with oxygen in air at ordinary temperatures. Specifically, we utilize sodium hydrosulphite which is capable of reacting with air to form an oxidation product which may be sodium sulphite or sodium sulphate.

In the preferred embodiment of our invention, we provide a mixture of this material with sodium bicarbonate, or its equivalent, to which a limited amount of water may be added. This combination is capable of reacting with air, removing the oxygen therefrom and allowing the nitrogen therein to pass through the reaction mixture, at the same time liberating carbon dioxide from the composition.

The following is the reaction which takes place to give the result stated above.

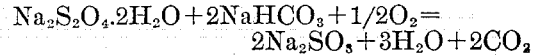

$$Na_2S_2O_4.2H_2O + 2NaHCO_3 + 1/2O_2 = 2Na_2SO_3 + 3H_2O + 2CO_2$$

In the accompanying drawing, constituting a part hereof and in which like reference characters designate like parts, Figure 1 is a vertical cross-sectional view showing our invention in use in connection with a transformer, and Fig. 2 is a cross-sectional view taken on line II—II of Fig. 1.

The tank 1 contains a transformer 2 and the ordinary terminals or bushings 3. Insulating oil 4 fills the major portion of the tank, leaving an air space 5 at the top thereof. A pipe 6 communicating with the top of tank 1 is connected to a container 7 having an opening 8 in the lower end thereof. In the container 7 are two concentric cylinders 9 and 10 of gauze between which is a filling 11 of my new material, which generally comprises a mixture of sodium hydrosulphite and sodium bicarbonate with a small amount of water.

The container for the deoxidizing material constitutes the subject matter of the copending application of C. J. Rodman and L. H. Hill, Serial No. 665,408, filed Sept. 28, 1923, and assigned to the Westinghouse Electric & Manufacturing Company.

In operation, assuming that the oil 4 in the transformer tank 1 is contracting, air is drawn in through opening 8 and is distributed in the space 12 between container 7 and gauze 9. It is drawn through the material 11 into space 13 and then to pipe 6 and space 5 of the transformer tank 1.

In practice, the oil level in tank 1 is raised to the top of the transformer tank and the incoming gas through pipe 6 consists essentially of $CO_2$ and nitrogen and no oxygen. If the oil level is not raised and the transformer allowed to breathe, the interchange of gas will subsequently deplete the atmosphere of its oxygen content. This process is accomplished before any oxidation can affect the oil.

We have found that, after considerable use, the atmosphere in the space 5 consists essentially of a mixture of nitrogen and carbon dioxide in about the proportions of 60% nitrogen and 40% carbon dioxide. Such a mixture we have found to be an excellent fire extinguisher, even when as little as 15% or 20% thereof is mixed with air. Both of the components of the mixture are excellent preservatives of oil, thus maintaining the high dielectric strength and the insulation value of the transformer oil.

The mixture which we preferably use is easily handled, it is practically non-corrosive and is not subject to spontaneous combustion. The sodium bicarbonate, in addition to causing the liberation of carbon dioxide, has a stabilizing effect on the sodium hydrosulphite, thus preventing deterioration thereof when not in use.

Although in the reaction equation given, we have designated complete water of crystallization of the sodium hydro-sulphite, we have obtained excellent results with the utilization of only a portion of the theoretical quantity of water specified, for instance, as little as less than one-half the theoretical quantity of water of sodium hydrosulphite hydration. The reaction may proceed with the formation of sodium sulphite as indicated, or it may result in the formation of the sulphate. In the specific example given, the use of the sodium salts has been mentioned, but other metals than sodium may be substituted therefor. Illustrative of these metal hydrosulphites are those of zinc or magnesium.

We claim as our invention:

1. Means for obtaining inert atmospheres comprising an oxidizable salt capable of removing oxygen from an atmosphere containing the same and a bicarbonate of an alkali metal for preventing deterioration of said salt.

2. Means for obtaining inert atmospheres comprising a hydrosulphite of a metal and an alkali-metal bicarbonate, the mixture being capable of removing oxygen from an atmosphere containing the same.

3. Means for obtaining inert atmospheres comprising an alkali-metal hydrosulphite and an alkali-metal bicarbonate, the mixture being capable of removing oxygen from an atmosphere containing the same.

4. Means for obtaining inert atmosphere comprising an alkali-metal hydrosulphite, an alkali-metal bicarbonate and a small amount of water, the mixture being capable of removing oxygen from an atmosphere containing the same.

5. Means for obtaining inert atmospheres comprising an alkali-metal hydrosulphite and sodium bicarbonate, the sodium bicarbonate being added in sufficient proportions to produce a comparatively large amount of carbon dioxide when the mixture is exposed to the air and to preserve the hydrosulphite when the mixture is not exposed to the air.

6. Means for obtaining an inert atmosphere comprising an alkali-metal hydrosulphite, sodium bicarbonate and a small amount of water, the sodium bicarbonate being added in sufficient proportions to produce a comparatively large amount of carbon dioxide when the mixture is exposed to the air and to preserve the hydrosulphite when the mixture is not exposed to the air.

In testimony whereof, we have hereunto subscribed our names this 13th day of July, 1923.

CLARENCE J. RODMAN.
AYLMER H. MAUDE.